United States Patent Office 3,285,506
Patented Nov. 15, 1966

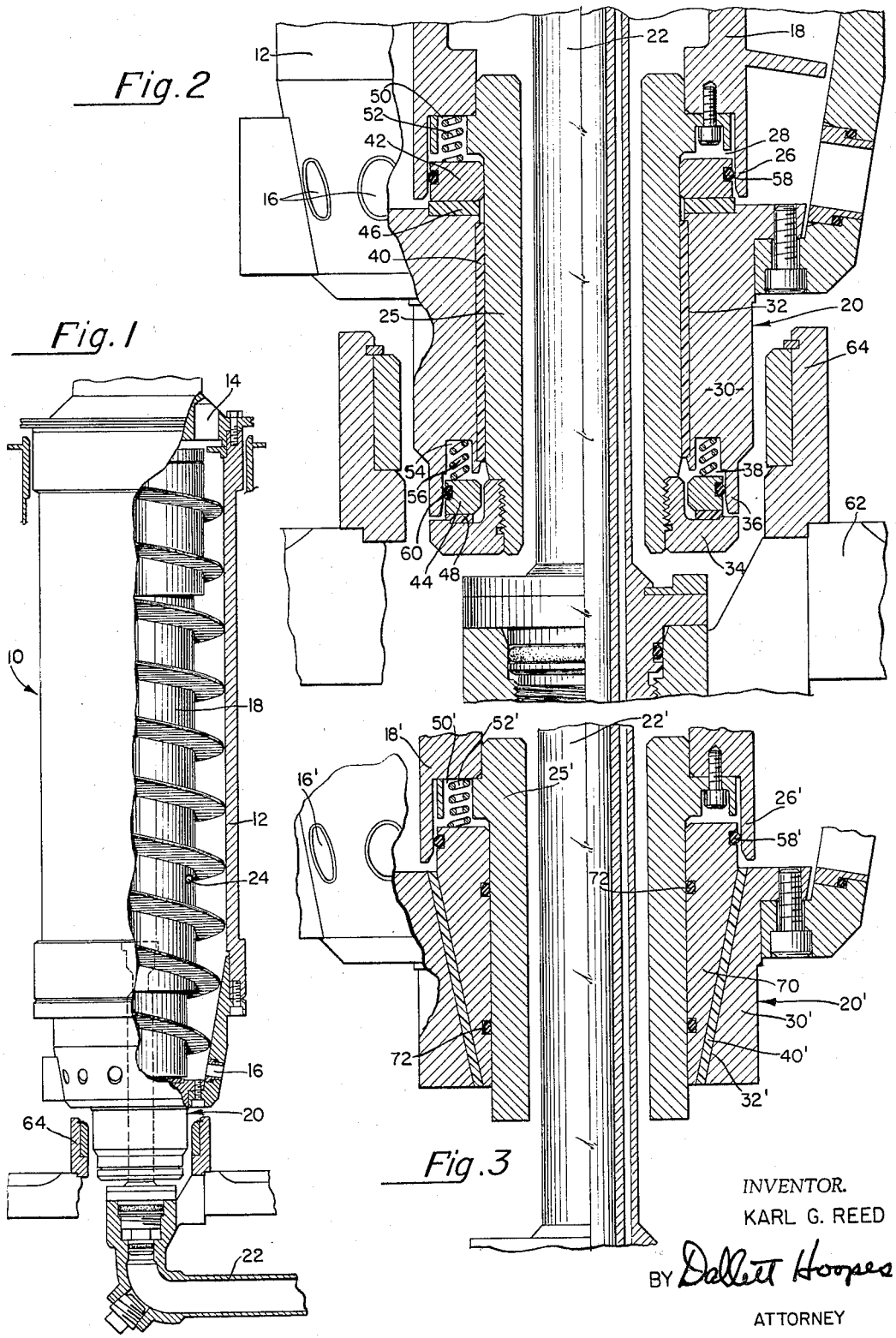

3,285,506
CENTRIFUGE HAVING SELF-LUBRICATING BEARING
Karl G. Reed, Wayne, Pa., assignor to Pennsalt Chemicals Corporation, Philadelphia, Pa., a corporation of Pennsylvania
Filed May 4, 1964, Ser. No. 364,716
5 Claims. (Cl. 233—1)

This invention relates to centrifuges. More specifically this invention relates to centrifuges of the continuous solids discharge type comprising a hollow rotor having a helical conveyor within it for the purpose of moving the solids toward a solids discharge port. In such a centrifuge the invention provides bearing means between the rotor and the conveyor.

In the past much difficulty has been experienced with respect to the bearings between the conveyor and rotor of continuous solids discharge machines. The primary cause for this difficulty has been the vulnerability of previous bearing arrangements to the vapor and abrasives contained in the process atmosphere. For instance, some process vapors dissolve the bearing lubricant. Temperatures of operation in some installations have broken down lubricants, leaving a gummy residue causing the bearings to run dry and ultimately freeze.

I have conceived and perfected a bearing assembly especially suitable as the lower bearing in a continuous solids discharge centrifuge having a vertical axis. My bearing assembly requires no lubrication and is isolated from the surrounding atmosphere. It hence will not be vulnerable to lubrication-attacking vapors or to high temperatures which tend to break down lubricants. At the same time a bearing in accordance with my invention may not only give lateral support to the conveyor within a centrifuge rotor but may also support all of the weight of the conveyor.

Other features of the invention will be apparent from the following specification, including drawings, wherein:
FIGURE 1 is an elevational view partly in section of an apparatus embodying the invention;
FIGURE 2 is an enlarged partly sectional view of a portion of FIGURE 1; and
FIGURE 3 is a similar view of a modification.

Referring more specifically to FIGURE 1, an apparatus embodying the invention is generally designated 10. It comprises a rotor 12 having a liquid discharge 14 and a solids discharge 16. The rotor contains a helical conveyor 18 which is mounted for rotation within the rotor 12 on an upper bearing (not shown) and a lower bearing 20. A feed tube 22 supplies feed which enters the rotor through an opening 24 in the conveyor. The rotor is mounted in a casing (not shown) and the rotor and conveyor are driven at different speeds by drive means (not shown).

Referring in greater detail (FIGURE 2) to the area of the lower bearing 20, it may be regarded as an assembly including a downwardly extending spindle 25 secured to the lower end of the conveyor. The conveyor presents a downwardly extending lip 26 which is spaced annularly outward from the body of the spindle to provide a downwardly facing pocket 28 therebetween.

The bearing assembly 20 also includes a downwardly extending hub 30 of the rotor. As shown the hub presents a central opening 32 with a circular wall, the opening receiving the spindle 25. Below the hub the spindle is provided with an outward annular projection 34 and the hub is formed with a downward annular flange 36 spaced annularly outward from the body portion of the spindle to provide a downwardly facing pocket 38.

A bushing 40 of resilient plastic surrounds and engages the spindle in the area between the spindle and opening 32 in the hub. Preferably the resilient plastic is a reinforced polytetrafluoroethylene and may comprise a sheet appropriately skived off at its opposite ends and wrapped about the spindle. The reinforcement may be of powder binder or the like or glass filaments or the like and in a suitable form is of a reinforced material available in the trade under the trademark "Rulon," a product of The Dixon Corporation.

As shown an upper washer 42 surrounds the spindle above the bushing 40 and a lower washer 44 surrounds the spindle below the bushing. These washers fit respectively in the pockets 28 and 38. An upper annular seal 46 is provided intermediate the upper washer and the hub, and a lower annular seal 48 is disposed intermediate the lower washer 44 and the annular outward projection 34. The annular sealing means may be of the same material as the bushing 40 if desired. In the preferred form the upper annular seal 46 rests against the hub therebelow and the lower annular seal rests against the annular projection 34 therebelow. They may be easily replaced as desired or necessary.

As shown, the spindle 25 has an upper outward flange which is apertured at 50 at spaced intervals thereabout and receives compression springs 52 which serve as spring means urging the washer 42 downward toward the hub 30 so that its lower face is in running contact with the annular seal 46. Similarly the hub is formed with openings 54 which receive compression springs 56 which serve as spring means to urge the lower washer 44 downward toward the outward annular projection 34 so that its lower face is in running contact with the annular seal 48. The lower faces of both the washers 42 and 44 are highly polished.

In a preferred form as shown, the outer annular surface about the washers 42 and 44 are grooved to receive resilient O-rings 58 and 60, respectively. The upper O-ring 58 engages lip 26 and thereby provides sealing means sealingly connecting the upper washer and the conveyor. The lower O-ring 60 engages lip 36 and thereby comprises lower sealingly means sealingly disposed between the lower washer 34 and the hub.

The feed tube 22 is supported by arms 62 extending inward from the casing (not shown). The arms 62 also support a conventional damping ring 64.

By virtue of the described arrangement, no lubrication is necessary for the bearing between the conveyor and the rotor, for at the commencement of operation the bushing of plastic which is thrown out under centrifugal force against the hub and rotates with the hub coats the surface of the spindle which it contacts with a virtually continuous layer of plastic particles adequate to lubricate the relatively moving surfaces. To keep abrasives which may be in the process atmosphere away from the bushing clearances the washer-annular seal combinations 42, 46 and 42, 48 seal off the bushing area. Were the washer-seal combinations not provided abrasives could possibly find their way into the clearance between the bushing and the spindle and cause wear on one or both elements. As another advantage all of the weight of the conveyor may be borne by the upper washer-annular seal arrangement 42, 46 dependent on the strength of the compression springs 52.

A modified form also embodying the invention is shown in FIGURE 3 and primed forms of the same reference numeral are used to designate parts corresponding to those parts of FIGURE 2. As shown the opening 32' in the hub is made of frusto-conical shape and a complementing bearing cone 70 rides on the spindle 25'. The frusto-conical bushing 40' preferably of the indicated plastic interposes the hub and cone. The cone is provided with O-rings 72 which seal the space between the spindle and cone. The springs 52' urge the cone downward against the bushing 40' and thereby into sealing and bearing relation with the hub. The O-rings 58' provide sealing means between the cone and conveyor 18'.

One of the advantages of the FIGURE 3 embodiment is that there is no need for clearance between the cone 70 and bushing 40', because the weight of the conveyor urging the cone downward assures a seal. There is hence no need for the washer-seal combinations of the FIGURE 2 embodiment to isolate the bushing. Further the arrangement of FIGURE 3 will automatically compensate for bushing wear.

Because the bearing assemblies of the present invention need no lubrication there is virtually no restriction on the process temperatures with which it may used, except of course the temperature tolerance of the bearing material. Additionally, because there is no lubrication required, the present bearing is not vulnerable to attack by process vapors which leach out lubrication from ordinary bearings.

Variations including reversal of parts from those shown and other modifications fall within the scope of this invention. Therefore, it is to be understood that the above particular description is by way of illustration and not of limitation, and that changes, omissions, additions, substitutions, and/or other modifications may be made without departing from the spirit of the invention. Accordingly, it is intended that the patent shall cover, by suitable expression in the claims, the various features of patentable novelty that reside in the invention.

I claim:

1. In a centrifuge comprising a hollow rotor mounted for rotation about a vertical axis, the rotor having an imperforate peripheral wall with ports for discharge of separated solids and liquid, respectively, a helical conveyor mounted for rotation in bearing means within the rotor and adapted to move solids toward the solids discharge port, means to deliver a feed slurry into the rotor, means to drive the rotor and the conveyor at different speeds; the improvement wherein the bearing means includes a lower bearing assembly comprising a downwardly extending spindle secured to the lower end of the conveyor, a hub portion secured to the lower end of the rotor and having a central opening with a circular wall, the opening receiving the spindle, an outward annular projection mounted on the spindle below the opening, a bushing of resilient plastic surrounding and engaging about the spindle inside the opening and engaging the circular wall of the opening, upper and lower washers surrounding the spindle above and below the bushing, respectively, an upper annular seal of resilient plastic disposed intermediate the upper washer and the hub and a lower annular seal of resilient plastic disposed intermediate the lower washer and the annular outward projection, upper spring means on the conveyor urging the upper washer downward toward the hub to effect a seal between the upper washer and the hub with the upper annular seal inbetween, lower spring means on the hub and urging the lower washer downward toward the outward annular projection, to effect a seal between the lower washer and the outward annular projection with the lower annular seal inbetween, upper sealing means sealingly disposed between the upper washer and conveyor and lower sealing means sealingly disposed below the lower washer and the hub.

2. A centrifuge as described in claim 1 wherein the bushing and the annular seals are of reinforced polytetrafluoroethylene.

3. In a centrifuge comprising a hollow rotor mounted for rotation about a vertical axis, the rotor having an imperforate peripheral wall with ports for discharge of separated solids and liquid, respectively, a helical conveyor mounted for rotation in bearing means within the rotor and adapted to move solids toward the solids discharge port, means to deliver a feed slurry into the rotor, means to drive the rotor and the conveyor at different speeds; the improvement wherein the bearing means includes a lower bearing assembly comprising a downwardly extending spindle secured to the lower end of the conveyor, a hub portion secured to the lower end of the rotor and having a central opening with a frusto-conical wall, the opening receiving the spindle, a bearing cone surrounding the spindle and in sealing relation therewith, the cone nesting in and complementing the opening in the hub portion, a bushing of resilient plastic surrounding and engaging about the spindle inside the opening and engaging the frusto-conical wall of the opening, spring means on the conveyor urging the bearing cone downward into bearing and sealing relation with the bushing, sealing means sealingly disposed between the bearing cone and conveyor.

4. A centrifuge as described in claim 3 wherein the bushing is of reinforced polytetrafluoroethylene.

5. A centrifuge as described in claim 3 wherein sealing means are provided between the spindle and bearing cone.

References Cited by the Examiner

UNITED STATES PATENTS

| | | | |
|---|---|---|---|
| 2,316,460 | 4/1943 | Schoenky | 308—36.2 |
| 3,053,586 | 9/1962 | Osborn | 308—36.1 |
| 3,061,181 | 10/1962 | Gooch | 233—7 |
| 3,096,128 | 7/1963 | Wight | 308—38—36.1 |
| 3,179,476 | 4/1965 | Hurwitt | 308—36.1 |

FOREIGN PATENTS

| | | |
|---|---|---|
| 86,002 | 8/1955 | Norway. |
| 59,266 | 5/1923 | Sweden. |

M. CARY NELSON, *Primary Examiner.*

HENRY T. KLINKSIEK, *Assistant Examiner.*